UNITED STATES PATENT OFFICE.

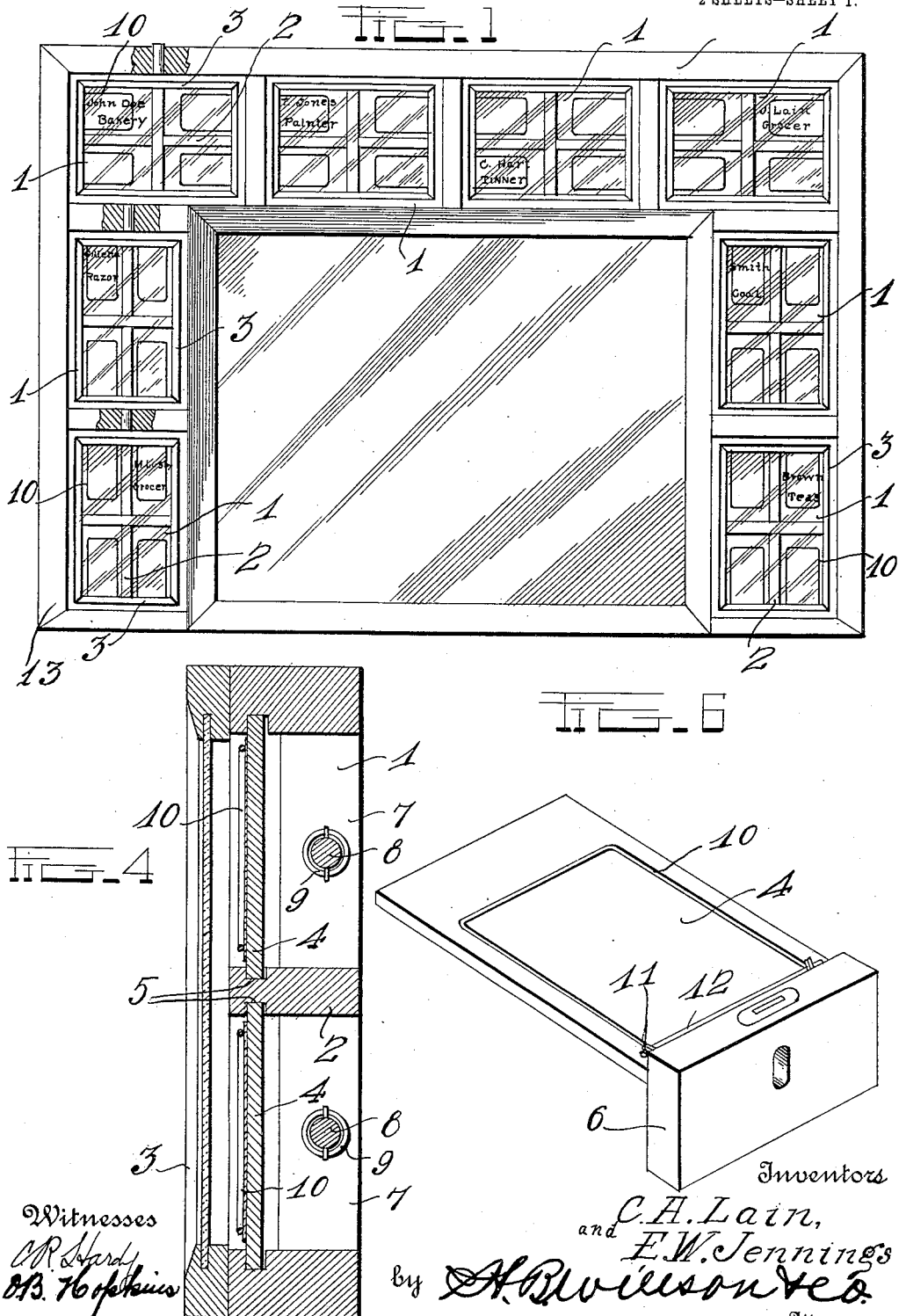

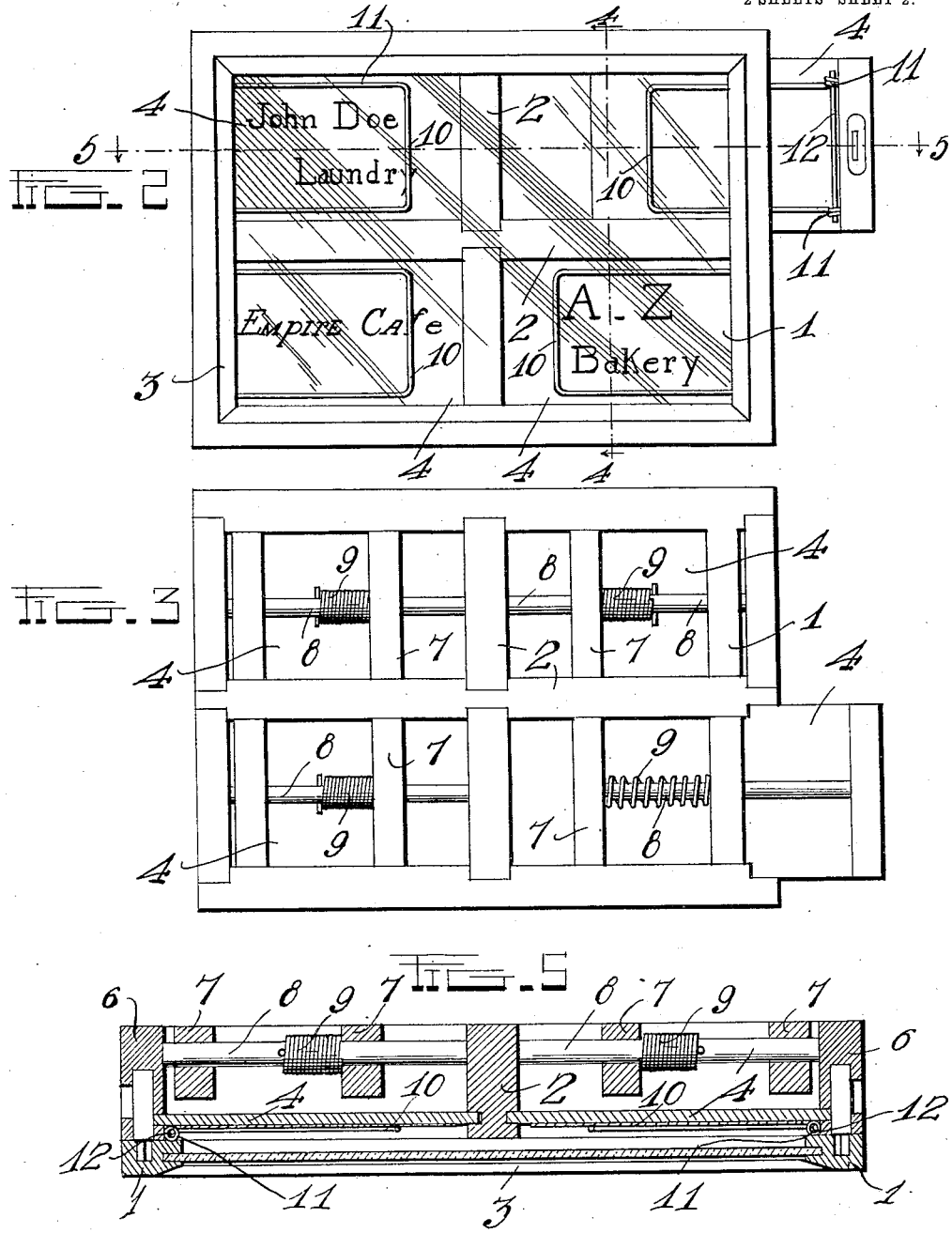

CHARLES A. LAIN AND EDWARD W. JENNINGS, OF HIGH POINT, NORTH CAROLINA, ASSIGNORS OF ONE-THIRD TO A. A. DICKENS, OF HIGH POINT, NORTH CAROLINA.

DISPLAYING DEVICE FOR ADVERTISEMENTS.

1,017,563. Specification of Letters Patent. Patented Feb. 13, 1912.

Application filed August 22, 1910, Serial No. 578,366. Renewed July 24, 1911. Serial No. 640,357.

*To all whom it may concern:*

Be it known that we, CHARLES A. LAIN and EDWARD W. JENNINGS, citizens of the United States, residing at High Point, in the county of Guilford and State of North Carolina, have invented certain new and useful Improvements in Displaying Devices for Advertisements; and we do declare the following to be a full, clear, and exact description of the invention, such as will enable others skilled in the art to which it appertains to make and use the same.

This invention relates to improvements in displaying devices for advertising.

One object of the invention is to provide an improved means whereby a number of advertisements may be displayed in public places by arranging the same in a suitable supporting frame over desks, or around mirrors in waiting rooms, hotels, banks or other public places where they will be conspicuously displayed.

Another object is to provide suitable cases in which the various advertisements may be placed under a glass cover which will protect the same and which are provided with means for holding the advertisements in place, so that they may be quickly removed and replaced by others without the necessity of employing tacks or other separate fastening devices.

With the foregoing and other objects in view, the invention consists of certain novel features of construction, combination and arrangement of parts as will be more fully described and particularly pointed out in the appended claim.

In the accompanying drawings: Figure 1 is a front view of a portion of a mirror showing the application of the invention; Fig. 2 is an enlarged front view of one of the sections for holding the advertisements, showing one of the slides thereof in open position. Fig. 3 is a rear view of the same; Fig. 4 is a vertical section on the line 4—4 of Fig. 2; Fig. 5 is a horizontal section on the line 5—5 of Fig. 2; Fig. 6 is a perspective view of one of the slides removed from the casing.

In carrying out the invention we provide a series of cases 1, which may be of any suitable size and shape and are here shown as being of rectangular form. Each of the cases 1 is preferably divided into two or more compartments by means of partitions or dividing strips 2. The cases are covered on their outer sides by glass cover frames 3 whereby the advertisements arranged in the cases may be clearly read but will be protected from the elements or from disfigurement or mutilation by vandals. In the compartments formed by the partitions 2 are advertisement holding plates or slides 4, which are adapted to slide in grooves 5 formed in the inner sides of the dividing strips or partitions 2 adjacent their outer edges. The slides 4 extend out through the ends or sides of the cases and are provided on their outer ends with end blocks 6 which, when the slides are in closed position, form parts of the ends or sides of the casing.

Slidably mounted in apertured guide strips 7 arranged between the partitions 2 of the cases are slide projecting rods 8 around which are arranged coiled springs 9, said springs being arranged between the guide strips 7 and stop pins in the rods whereby the pressure of the springs is exerted to project the outer ends of the rods outwardly beyond the opposite ends of the sides of the cases. As the outer ends of the slide projecting rods are in engagement with the ends will be forced outwardly to an open position of end blocks 6 of the slides, the latter by the expanding of the springs 9 and the consequent projecting movement of the rods 8.

In order to hold the slides in operative engagement with the compartments in the cases, we provide each slide with a suitable key operated locking mechanism which will securely hold the slides against removal from the casing by unauthorized persons. When the locking mechanism is released the slides will be immediately forced open by the slide projecting rods 8 and springs 9, thus permitting access thereto for the insertion of the advertisements carried thereby.

In order to removably hold the advertisements in place on the slides without the use of tacks or similar fastening devices, we provide a suitable clamping mechanism comprising a bail shaped wire clamping frame 10, the outer ends of which are bent into the form of spring coils 11, and are held in the end blocks of the slides. The clamp is provided at its outer end with a transversely disposed bracing rod 12 which is preferably engaged at its outer ends with the coils 11. By thus arranging the clamp the bail shaped outer portion thereof will be held in yielding engagement with the outer surface of the slides and will clamp between the same and said surface of the slides any advertising matter which it is desired to exhibit in the casing. By this arrangement the advertising matter may be quickly applied to the slides or removed therefrom when desired.

In arranging the invention it is the intention to place the cases 1 in a suitable supporting frame 13 built around bulletin boards, mirrors or over desks, counters or similar devices in public places where the advertisements thus displayed may be readily seen by persons passing or using the objects to which the cases are applied. The supporting frames for the cases may be of any desired shape and are built to conform to the shape of the object around or over which the cases are to be placed.

From the foregoing description taken in connection with the accompanying drawings, the construction and operation of the invention will be readily understood without requiring a more extended explanation.

Various changes in the form proportion and the minor details of construction may be resorted to without departing from the principle or sacrificing any of the advantages of the invention as defined in the appended claim.

Having thus described our invention, what we claim is:

An advertisement displaying device comprising a series of cases having arranged therein partitions whereby said cases are divided into compartments, glass cover frames arranged over said cases, a series of advertisement carrying slides having a sliding engagement with the partitions in said cases, and spring actuated slide projecting rods arranged in the rear portion of the cases and adapted to force said slides to an open position, and a locking mechanism to hold the slides in closed or operative position.

In testimony whereof we have hereunto set our hands in presence of two subscribing witnesses.

CHARLES A. LAIN.
EDWARD W. JENNINGS.

Witnesses:
S. H. HILLIARD,
J. W. BUNDY.

---

Copies of this patent may be obtained for five cents each, by addressing the "Commissioner of Patents, Washington, D. C."